United States Patent Office 3,490,812
Patented Jan. 20, 1970

3,490,812
**METHOD AND ARRANGEMENT FOR UNLOAD-
ING GRANULAR OR LUMPY CARGO**
Shuji Uchida, Yokohama-shi, Japan, assignor to Nippon
Kokan Kabushiki Kaisha, Tokyo, Japan, a corporation
of Japan
Filed Dec. 18, 1967, Ser. No. 691,441
Claims priority, application Japan, Dec. 20, 1966,
41/83,372
Int. Cl. B65g 53/30; B63b 27/00
U.S. Cl. 302—14                                        2 Claims

ABSTRACT OF THE DISCLOSURE

This arrangement for unloading water-insoluble granular or lumpy cargo heavier than water includes a combination of wharfage and a pumping device, the wharfage having a pit disposed on its bed extended into the water in front of its wall and the pumping device communicating with the pit so as to suck up with water the granular or lumpy cargo discharged into the pit through the drain port at the bottom of a ship hold by opening a shutter provided therein.

---

This invention relates to a method and arrangement for landing granular or lumpy goods from a cargo boat anchored alongside the wall of wharf.

Hitherto, due to a time-consuming unloading operation, the ship had to be kept anchored for long in the port of discharge, thus preventing the effective utilization of the wharfage. For instance, the unloading including land haulage of granular or lumpy cargo such as ore and coal stored in a hold was carried out by various means, for example, conveyers, trucks, wagons, etc. and, moreover, the transfer of goods from one step of transport to another required no small length of time, so that a considerable period had lapsed before the ship left the quay. The development of this invention stems from the fact that the aforementioned cargo is heavier than water and insoluble therein.

An object of this invention is to provide a method and arrangement for unloading granular or lumpy goods which has been improved so as to reduce the time of landing.

Another object of this invention is to provide a method and arrangement for unloading granular or lumpy cargo which is operable in a liquid transportation system so as to curtain personnel expenses.

The method of this invention for landing water-insoluble granular or lumpy cargo heavier than water comprises the steps of discharging the cargo through a drain port at the bottom of a ship hold into a pit disposed on the bed of the wharfage extended into the water in front of its wall by opening a shutter provided at the bottom of the hold and sucking up the cargo with water on to the land by means of a pumping device.

The arrangement of this invention for unloading granular or lumpy cargo includes a combination of wharfage and a pumping device. The wharfage has a pit disposed on its bed extended into the water in front of its wall so as to receive the granular or lumpy cargo discharged through a drain port at the bottom of the hold by opening a shutter provided therein, and the pumping device consists of a suction pumper pumps and a conduit or conduits communicating with the pump, one end of the conduit opening to the pit thereby to suck up with water the cargo collected into the pit.

Figure 1:
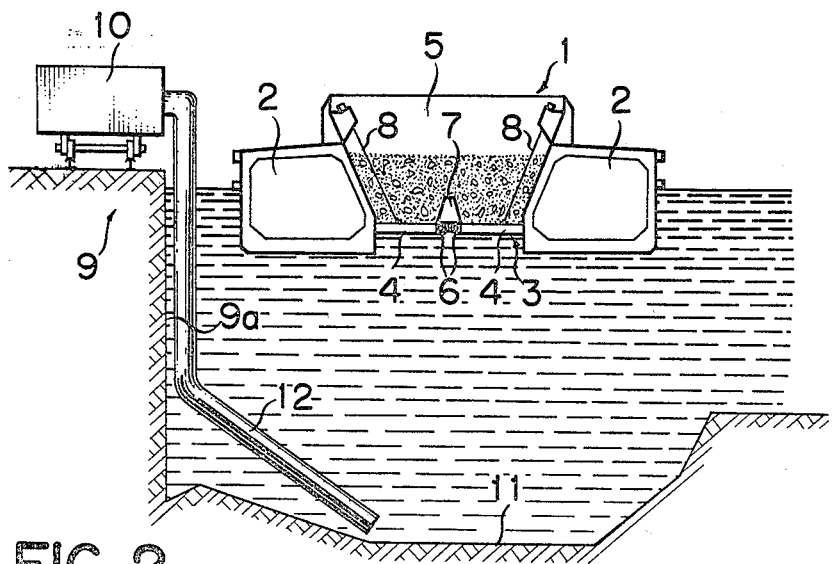
Figure 2:
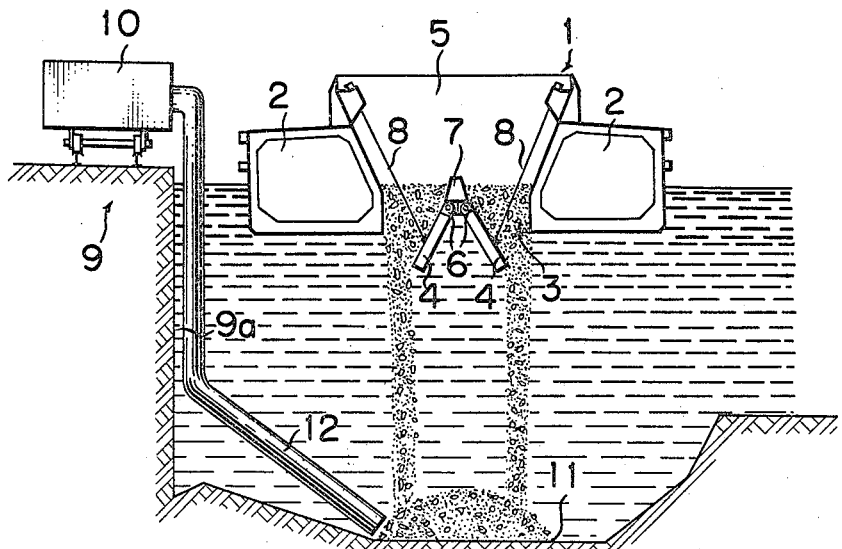

The invention is now described in conjunction with a preferred embodiment with reference to the accompanying drawing, in which:

FIG. 1 is a sectional view of a cargo boat with a cargo and a combination of wharfage and a pumping device according to this invention; and FIG. 2 is a schematic diagram of the unloading equipment including the wharfage of FIG. 1, showing how the cargo is discharged out of the hold into the pit and then sucked up with water on to the land by means of a suction pump.

Referring to the drawing, a cargo boat indicated at 1 has float tanks 2 disposed on both sides thereof, and a drain port 3 with two shutter doors 4 disposed at the bottom of a hold 5. Each of the shutter doors 4 is pivoted to the center girder 7 of the boat by means of hinge 6 provided at one end of the door. The drain port 3 is opened and closed by operating the shutter doors 4 by means of shift chains 8.

In a loading port, granular or lumpy cargo such as ore and coal is carried into the hold adapted for liquid transportation. Namely, the bulk material is transported from a conveyor for wet conveying to the loading port through a pipe-line, and then is introduced with water carrier into the cargo hold. The water carrier is separated from the cargo due to the different gravities between them, and drained out.

In an unloading port, a combination of wharfage 9 and a pumping device 10 is provided for landing the granular or lumpy cargo. The wharfage 9 has a pit 11 disposed on its bed extended into the water in front of its wall 9a. The pumping device 10 has a suction pump or pumps (not shown) and a conduit or conduits 12 communicating with the pump. One end of the conduit is opened to in pit 11.

To discharge the cargo, the boat is first guided to a point above the pit and anchored alongside the wall of the wharfage 9. The shutter doors are opened to pour the cargo from the hold on to the floor of the pit. The cargo in the pit is finally sucked up through the conduit to the land by the operation of a suction pump.

The cargo boat leaves the wharf as soon as unloading is complete, and then another boat comes in and is anchored there. Throughout this time the suction of the cargo from the pit is continued.

In the arrangement of this invention, the shutter doors may be perforated with holes through which the cargo hold can communicate with the water outside of the ship. However, the holes should have a sufficiently small diameter to prevent the loss of bulk cargo due to its passage therethrough. The perforated shutter doors have the advantage that even if the water carrier is introduced with the cargo into the hold in a loading port, it will be naturally removed through the holes.

While the invention has been described in connection with some preferred embodiments thereof, the invention is not limited thereto and includes any modifications and alternations which fall within the true spirit and scope of the invention as defined in the appended claims.

What is claimed is:

1. A method for unloading water-insoluble granular or lumpy cargo heavier than water, comprising the steps of: opening a shutter in a drain port at the bottom of a ship hold and discharging the cargo therethrough into a pit disposed in the bed of a wharf, said pit extending into the water in front of the wharf wall and sucking up the cargo with water on to the wharf.

2. A mechanical arrangement for unloading water-insoluble granular or lumpy cargo heavier than water from a ship having a drain port with a shutter at the bottom of a hold thereof, comprising in combination: a wharf with a wall extending into the water, a pumping device on said wharf, a pit disposed in a bed extending into the water in front of said wall so as to receive the cargo poured through the drain port by opening a shutter provided therein, and the pumping device has a suction means and a conduit means communicating with the pump, one end of the conduit opening into the pit so as to suck up the cargo collected into the pit with water.

References Cited

UNITED STATES PATENTS

| | | | |
|---|---|---|---|
| 2,693,282 | 11/1954 | Sensibar | 114—36 |
| 3,217,682 | 11/1965 | Christianson | 114—36 |
| 3,248,812 | 5/1966 | Gardner | 302—14 |
| 3,269,571 | 8/1966 | McLearn et al. | |

ANDRES H. NIELSEN, Primary Examiner

U.S. Cl. X.R.

214—12